United States Patent [19]

Thompson

[11] 4,224,527
[45] Sep. 23, 1980

[54] FLUID FLOW INTENSIFIER FOR TIDE, CURRENT OR WIND GENERATOR

[76] Inventor: Jack E. Thompson, Edgmont, Wood House La.; Holbury, St. Mary nr. Dorking, Surrey, England

[21] Appl. No.: 922,414

[22] Filed: Jul. 6, 1978

[51] Int. Cl.² ............................................. F03B 13/10
[52] U.S. Cl. ....................................... 290/54; 290/43
[58] Field of Search ................................. 290/42–44, 290/53–55; 60/398; 415/2–4

[56] References Cited

U.S. PATENT DOCUMENTS

| | | | |
|---|---|---|---|
| 1,345,022 | 6/1920 | Oliver | 415/3 |
| 3,986,787 | 10/1976 | Mouton, Jr. et al. | 290/54 X |
| 4,060,344 | 11/1977 | Ootsu | 290/42 X |
| 4,143,522 | 3/1979 | Hamrick et al. | 60/398 X |
| 4,149,092 | 4/1979 | Cros | 290/54 |

FOREIGN PATENT DOCUMENTS 500360  1/1951  Belgium ................................. 60/398

Primary Examiner—J. V. Truhe
Assistant Examiner—W. E. Duncanson, Jr.
Attorney, Agent, or Firm—Sughrue, Rothwell, Mion, Zinn and Macpeak

[57] ABSTRACT

A method is described of intensifying a relatively slow speed natural substantially horizontal flow of a natural fluid, such as a tidal flow, as opposed to a tidal rise, or a river flow, the natural flow being used to turn about a substantially horizontal axis rotary means arranged to act directly on a working fluid, which may be the natural fluid, where the latter is a liquid, or a separate liquid, and force it through a pipe system to a flow intensifier in the form of a constriction. The working liquid is forced through the pipe system without the formation of an head, and can be used to drive means for generating electricity. Flow intensifying apparatus is also described using seawater as the natural fluid and either fresh water or the seawater as the working fluid. Several of the apparatus may be disposed to cause a vortex or maelstrom which then serves to drive the apparatus.

23 Claims, 3 Drawing Figures

FLUID FLOW INTENSIFIER FOR TIDE, CURRENT OR WIND GENERATOR

This invention relates to a method of and apparatus for generating useful electrical energy from large quantities of fluid flowing at a relatively slow speed, for example from tidal flow, tidal rise and ocean currents, or from the wind.

Flows caused by water trapped behind barrages from tidal rise can also operate the apparatus as could low speed propellers driven by the wind.

There has been no lack of proposals for harnessing the tides to provide electrical energy but most of these proposals are either not feasible, ecologically disastrous, or would be so inordinately expensive as to be impractical.

The problem with tidal flow or ocean currents is the fact that although vast quantities of water are on the move the rate of movement is low being of the order of one to five knots and only rarely at ten knots. Tidal flow or ocean currents are therefore too slow to drive orthodox turbines to generate electricity.

Furthermore, in the case of tidal flow there is no locally elevated head of water to drive a turbine, merely a movement of water, whereas, in the case of tidal rise there is only a very small head of water which is, on average, 10 feet. Consequently, water flow rates will be extremely small compared with those found in orthodox hydroelectric power schemes where heads of 1000 feet can be encountered. Thus, for example, estuarine barrages which have been built or proposed can only generate electricity for a period between high tide and low tide when the water trapped behind the barrage is released through turbines, and in any case the head of water is extremely low say on average ten feet, consequently flow rates are relatively low and orthodox generators need many poles.

The present invention is directed to providing a high speed water flow sufficient to drive an electrical generator at a high rate of revolutions per minute but derived from a low speed flow present either as tidal flow, an ocean current, the flow of a river, the flow as a result of tidal rise behind a barrage or the wind.

According to one aspect of the present invention there is provided a method of intensifying a fluid flow, wherein a relatively slow speed natural, substantially horizontal flow of a natural fluid is used to turn about a substantially horizontal axis rotary means arranged to act directly on a working fluid and force the working fluid through a pipe system without the formation of an elevated head to a flow intensifier in the form of a constriction whereby the flow of working fluid is sufficient to drive means for generating electricity.

According to another aspect of the present invention there is provided apparatus for intensifying a fluid flow, comprising a pipe system, a flow intensifier in the form of a constriction in said pipe system, driven means in said flow intensifier adapted to be driven by a flow of a working fluid in said flow intensifier and adapted to drive means for generating electricity, rotary means rotatable about a substantially horizontal axis associated with said pipe system for forcing working fluid without the formation of an elevated head to said flow intensifier and means drivable by a relatively slow speed natural, substantially horizontal flow of a natural fluid to turn said rotary means.

Yet another aspect of the present invention relate to the generation of electricity using the method and apparatus just indicated. The electricity thus generated may be used for the electrolysis of water to provide hydrogen as a chemical fuel.

There have been many proposals for harnessing the power of waves and tides by using them to operate piston pumps which are then used to raise a working fluid, usually the sea or lake water involved, to a high level reservoir to provide an elevated head of water, the potential energy of which is utilised to generate electricity.

In contradistinction to these proposals, the present invention resides in the use of a relatively low speed natural, substantially horizontal flow of a natural fluid to turn rotary means, such as an archimedean screw, for pumping the working fluid to the flow intensifier without forming an elevated head of working fluid, so that the relatively slow movement of a large amount of the natural fluid is converted directly into a controllable but much faster flow of a relatively small amount of the working fluid which may then be used to generate electricity.

The working fluid may be in a closed system, or an open system may be employed in which the natural fluid, e.g. sea water or river water is also the working fluid. In each case, the low speed flow of the natural fluid, e.g. sea or river water or air, is used to pump relatively small quantities of the working fluid into a pipe system which leads to a constriction where high speed flow of the working fluid is obtained, this high speed flow serving to drive a turbine, pelton wheel, or other means for driving a generator for the purpose of generating electricity.

Thus, the present invention may be used to generate electricity from wind power, river flow, tidal flow, as opposed to tidal rise, although it may be made to make use of the flow obtained by the trapping of tidal rise in barrages, and ocean current flow.

It will be obvious that if energy is to be extracted from water flow, only a portion of the total energy available can be extracted otherwise flow would cease.

Therefore, since for example, tidal flow is so vast and the amount of energy to be extracted is only a very minor proportion, the efficiency of the present apparatus need not be high. Consequently the construction of the equipment on the low pressure side is not critical and can be made light in weight, of various materials to wide tolerances and by unskilled workmen. In the case of river flow or ocean currents, electricity could be generated on a 24 hour basis, and in the case of tidal flow, since the time of high tide and maximum flow varies progressively round our coasts a large part of the total installed capacity would always be generating electricity.

In order to enable the invention to be more readily understood, some examples thereof will now be described with reference to the drawings accompanying the provisional specification, in which.

Figure 1:
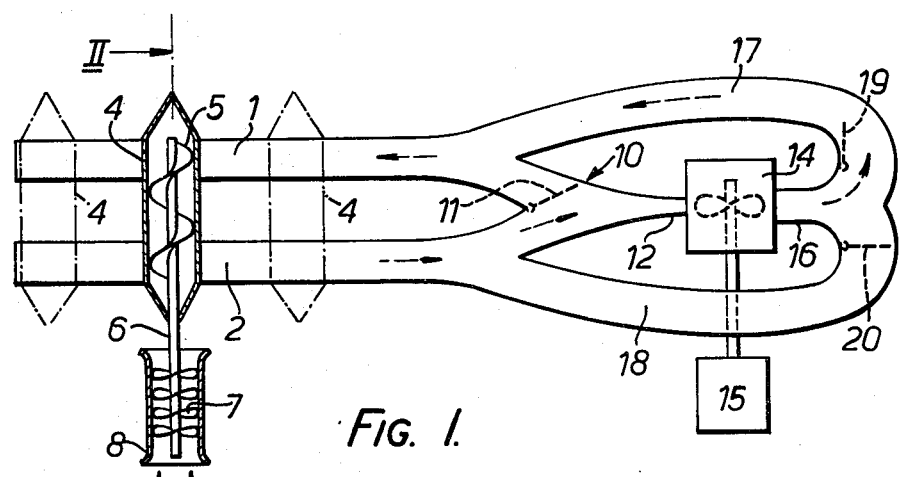
FIG. 1 is the plan view of apparatus for generating electricity from tidal flow.
Figure 2:
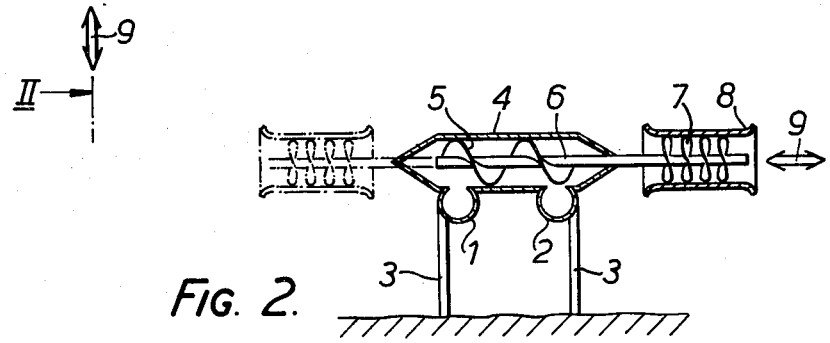
FIG. 2 is a section on the line 11—11 in FIG. 1.

Referring now to FIGS. 1 and 2, there is shown apparatus for generating electricity from water flow and which may be disposed at any appropriate location around the coast, in an ocean current or in a river bed.

The apparatus comprises two pipes 1 and 2 filled with water and mounted on piles 3 above the sea bed. While it is believed that the apparatus could be laid on the sea bed, it is anticipated that, by mounting the apparatus on piles, scavenging of the sea bed by the tide would not occur or would be minimised. Furthermore, the apparatus is less likely to be damaged by pebbles or choked by sand which may be moved by the tidal flow.

The pipes 1 and 2 are sealed at their ends (left hand ends in FIG. 1) and are interconnected by a plurality of transverse chambers 4 in each of which is mounted an archimedean screw-type impeller 5 mounted on a substantially horizontal shaft 6, only one of the chambers being shown in detail. It will be appreciated that the impeller will pump the water either from the pipe 1 to the pipe 2 or from the pipe 2 to the pipe 1 depending upon the direction in which it is revolved. The shaft 6 extends beyond the chamber and carries a low speed driving unit 7 which consists of a plurality of propellers commonly mounted on the shaft 6. If desired, the propellers may be surrounded by a flow-directing tube 8. It will be appreciated that the tidal flow, indicated by the thick arrow 9 will cause the unit 7 to revolve in one direction or the other causing the impeller 5 to pump water from one pipe to the other.

The pipes 1 and 2 lead to a junction pipe 10 in which is a flow-diverting valve 11 for preventing water flowing along one pipe 1 or 2 from entering the other. The pipe 10 leads to a constriction 12 where the flow of water is intensified so that the water, at a much higher velocity will pass into an impeller chamber 14 corresponding to the impeller chamber of a conventional hydroelectric generator. The impeller chamber contains impeller means arranged to drive a generator 15. An outlet pipe 16 from the impeller chamber leads to two return pipes 17 and 18 of which the pipe 17 returns to the pipe 1 and the pipe 18 returns to the pipe 2. The inlets to the pipes 17 and 18 are controlled by valves 19 and 20 respectively.

In the operation of the apparatus just described, it will be assumed that the tidal flow is in the direction of the small arrows adjacent arrow 9 in FIG. 1 and that this flow drives the unit 7 to cause the impeller 5 to pump water from the pipe 1 to the pipe 2. The valves 11 and 20 are in the positions shown with the valve 11 directing the flow from the pipe 2 to the constriction 12 and the valve 20 preventing flow through and return pipe 18. The water pumped by all the impellers 5 in all the chambers 4 thus flows from the pipe 2 through the constriction to drive the impeller means and the generator 15 and returns via the return pipe 17 to the pipe 1. When the tide turns, the direction of rotation of the unit 7 is reversed and the valves 11, 19 and 20 are changed over. Thus, water will be pumped from the pipe 2 to the pipe 1, flow to the constriction 12 and return via the pipe 18 to the pipe 2.

As indicated above, there is a plurality of the transverse chambers 4 each with its associated low speed driving unit 7 and impeller 5, and the number of chambers 4 will be the maximum practicable for any particular pipe system. If desired, the system of pipes 1 and 2 and transverse chambers 4 may be multiplied and arranged to feed into the junction pipe 10 so that only one generator would be needed for several pipe systems.

The pressures on the impellers 5, driving units 7 and the pipes 1 and 2 which are of relatively large bore, are relatively low. Consequently the construction of these latter items is not critical and they can be made light, of crude materials, to a minimum of tolerance requirements and by unskilled workmen. Even if damage were to occur to some of the impellers and driving units 7 the apparatus would still operate satisfactorily, albeit at lower efficiency, provided that the pipes 1 and 2 remained sealed.

The screw-type impeller 5 can be made of quite thin gauge metal and is preferably fitted with an antifriction skirt which would provide a good seal on the inner surface of the chamber 4.

Alternatively, the impellers could be mounted in a tube with the edge of the archimedean screw sealed to the inner face of the tube. Such a screw will still forward fluid when revolved in a fluid. The problem of sealing is now much easier since the seal need only be an annular ring not a spiral, the annular ring being between the outside of the tube and the inside of the chamber 4.

Instead of an archimedean screw type impeller, it would be possible to use a multiplicity of fan shaped impellers fitted into a tube with an annular seal between the outside of the fan tube and the inside of chamber 4. However, it is believed that the fan shaped impeller would not be so efficient as the archimedean screw. The pitch and diameter of the archimedean screw are balanced relative to the tidal flow rate and the diameter of propellers 7.

If the apparatus is installed in sea water, then marine growth, such as barnacles, might prove to be a nuisance. It is believed that this could be overcome by reversible electrolysis which would necessitate making the pipe system alternatively an anode or a cathode in a circuit comprising a metal bar acting as cathode or anode respectively. This would probably only need to be effected intermittently, perhaps on a weekly or monthly basis and would depend upon the marine conditions obtaining in the area where the pipe system was located.

If the pipes 1 and 2 are long enough and there are sufficient transverse chambers 4, it is possible to provide a generating assembly at each end of the pipes and the ends of the pipes 1 and 2 shown sealed in FIG. 1 (the left hand ends) could be led to another system of junction pipe, constriction, impeller chamber and return pipes.

It will be noted that the apparatus continually uses the same water in the pipe system, so that, in order to minimise corrosion, it would be possible to fill the pipe system with fresh water or other liquid rather than sea water.

In order to install the apparatus, which would be manufactured on shore, the apparatus, while filled with air, would be floated to the position in which it is to be submerged. By allowing fresh water to flow from tanks in a support ship into the apparatus, and allowing the air in the apparatus to escape, the apparatus could be submerged at any desired position.

Once underneath the hull of the support ship, the apparatus would be attached by cables to winches and lowered under control, until the correct height above the sea bottom were achieved.

All round the perimeter of the apparatus would be piles running in guides so that they dropped vertically down to contact the sea bottom. This could be done remotely or by skin divers and these piles would be locked in position once they had contacted the bottom so that the apparatus would rest on the piles with its undersurface well clear of the bottom of the sea.

Should seepage of salt water into the pipes ever be a problem, fresh water could always be pumped into the pipes from a service ship.

As indicated above, the reason for mounting the apparatus on piles is to avoid scavaging of the sea bed by the flow which would occur between the undersurface of the apparatus and the sea bed and furthermore the apparatus is less likely to be damaged or prevented from operating by pebbles or sand which could choke the apparatus.

An advantage which would accrue from the installation of such apparatus would be that the area could be used for fish farming yet the passage of vessels over the apparatus need not be impeded. Only fishing would be prohibited since nets or lines could not be used in the area.

Even if part of the apparatus were damaged, it could still function in most cases even at a lower efficiency.

Repairs could either be conducted on the sea bed by divers, or the apparatus could be raised merely by pumping air into the apparatus which would raise it from the sea bed.

In the case of a closed circuit fresh water internal mechanism, air could be pumped in without any extra operation, but in the case of an open unit using the medium in which it was submerged (as described hereinafter with reference to FIG. 3), it would first be necessary to temporarily seal the chambers before air could be pumped in.

The shape of the unit would be such that air could be locally pumped into the generator compartment to permit the generator to be serviced in air and not underwater with the obvious advantages which would accrue. Entrance to the generator compartment could be made through an air lock on the top of the compartment.

It is anticipated that in many cases units could be mounted one above the other in deep water. Whatever the depth or local conditions, means can be provided on the apparatus for increasing the flow rate through the apparatus by reducing the area for the oncoming water thus causing it to tend to increase its rate of flow through the orifices available.

Obviously this can only be carried out to a certain extent, but the more the flow rate can be encouraged to increase by locally changing conditions, the less the number of units which need to be installed per megawatt generated.

A plurality of the apparatus could be so installed relative to local conditions, that they actually cause a vortex or maelstrom to create itself thus using the power of a much larger volume of water than that relating to the apparatus to become involved in accelerating the flow of water in a rotary motion by artificial means, in this case the placing of the apparatus.

It is well known that whirlpools create themselves in water under the correct conditions and the flow of water is considerably increased, consequently more energy is available.

The same sort of phenomenon occurs in tornadoes and hurricanes where air starts to spin at high speed. However, it might take years of experiment to find how to create these conditions.

While the present apparatus continually uses the same water in the pipe system, so that, in order to minimise corrosion, it is possible to fill the pipes with fresh water or other liquid rather than sea water, this is probably not practicable in the case of apparatus for harnessing ocean currents which would be made up into a "hull" and then towed out to the site where the current flowed efficiently and would then be submerged and anchored by cable to the sea bed to keep the apparatus constantly in one position, thus enabling it to extract energy.

In the vastness of the ocean, far more energy could be extracted since any slowing down of the flow by the extracting mechanism would be absorbed and lost in the sheer vastness of the ocean surrounding the mechanism.

When it is appreciated that hundreds of horsepower are required to pump water through a pipe nine square feet in area at a speed of five knots, an idea of the energy which can be extracted will be seen when it is accepted that in an ocean current billions of tons of water pass a given point every second.

Due to the low efficiency requirements, the apparatus can be made from any suitable metal, fibre glass, glass, concrete or any new material developed for the purpose.

The apparatus shown in FIGS. 1 and 2 can also be adapted to generate electricity from wind power. In this case the apparatus may be situated on dry land and the low speed driving unit 7 is replaced by a connection to an air propeller such as that used on an artesian wells. However, as an air propeller can turn to face the wind, there is no reversal of flow and the return pipe 18, and valves 19 and 20 are not required; neither is the valve 11 since the pipe 2 will lead straight into the constriction 12.

In this case the wind propeller would drive a simple self-contained hydraulic intensifier where a slow large capacity pump would drive a small high speed low capacity motor which in turn would drive a generator.

The apparatus shown in FIGS. 1 and 2 may be combined with a barrage, and the low speed driving units would then be inserted in gaps in the barrage. In this case, the tidal current would be greatly accelerated through the flow-directing tubes 8 so that a smaller number of units and impellers would be required to generate a given amount of energy.

In a further modification of the apparatus shown in FIGS. 1 and 2, the shaft 6 is extended through the chamber 4 and carries a further low speed driving unit as shown in broken lines to the left hand side of FIG. 2. By this means the tractive effort on the screw-type impeller 5 would be doubled and the impeller would be more able to resist any back pressure which might be exerted on it from the pipe 1 or 2 into which the water was being pumped.

As indicated above, the flow directing tube 8 is optional, but, depending upon local conditions and tidal flow it may be desirable to form the tube with a large funnel shaped mouth at each end so as to accelerate the water through the tube. Care might be needed in designing the outside configuration of the tube 8 to prevent undue turbulence which might interfere with tidal flow or lead to scavenging of the sea bed.

Alternatively, the inside of the flow directing tube 8 could be fitted with a plurality of helically extending vanes for imparting a rotary motion to the water flowing through the tube and thus assisting the rotation of the propellers of the low speed driving unit 7. In this case, it would be possible to make the pitch of the propeller blades more acute so that they would offer less resistance to the flow of water but would extract a greater tractive effort from the flow with less turbulence and hence less detraction of effort on successive propellers by the obstruction caused by propellers in front of them.

Figure 3:
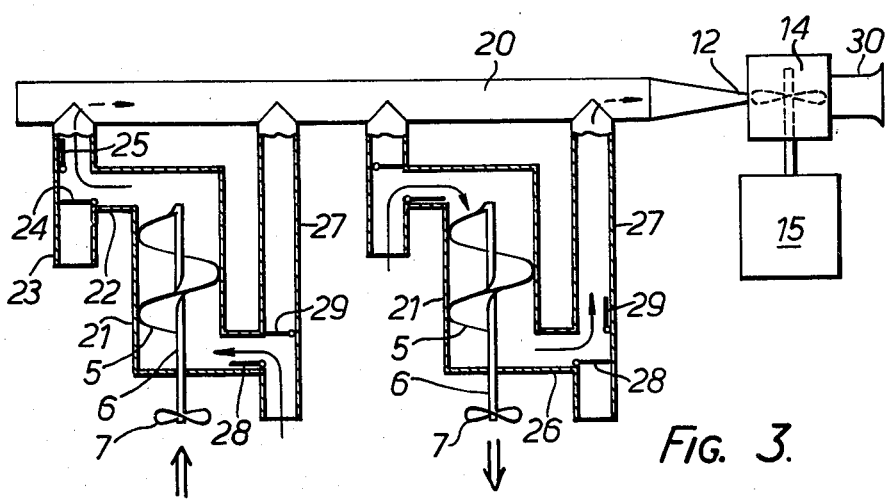
FIG. 3 is a plan view of a modification of the apparatus shown in FIGS. 1 and 2.

In another modification of the apparatus shown in FIG. 3, a framework mounted on top of the apparatus carries hinged arms connected to air filled tanks, which could conveniently act as warning buoys. The tanks have depending arms connected to piston rods of pistons mounted in cylinders disposed on the sea bed, the stroke of the pistons being such as to accommodate the full tidal rise or fall. The cylinders have flap valves controlling connections to the sea and to the pipe 20 and the arrangement is such that, as an air tank falls, water is drawn into the cylinder above the piston and, as the air tank rises, water is forced into the pipe 20 in which the flow is towards the constriction. By this means, additional flow is generated in the pipe not only by tidal rise and fall, but also by wave action or swell.

Referring now to FIG. 3, there is shown a simplified modification of the apparatus in which sea water not only provides the low speed flow but is also used as the working fluid. In this embodiment a single pipe 20 leads to a constriction 12 which leads to an impeller chamber 14 connected to a generator 15. Again a plurality of transverse chambers 21 is connected to the pipe 20. Only two such chambers are shown, one showing operation when the tidal flow is in one direction and the other chamber showing operation when the tidal flow is in the other direction. Each chamber contains an impeller 5 mounted on a substantially horizontal shaft 6 driven by a low speed driving unit 7 as in the apparatus shown in FIGS. 1 and 2. At one end, each chamber leads through a connection 22 into a pipe 23 leading directly from the sea into the pipe 20. Valves 24 and 25 are provided, the valve 24 serving to permit or prevent flow from the sea into the connection 22 and the valve 25 serving to permit or prevent flow from the connection 22 or pipe 23 into the pipe 20. At the other end, each chamber leads through another connection 26 into a pipe 27 also leading directly from the sea into the pipe 20. Valves 28 and 29 are provided, the valve 28 serving to permit or prevent flow from the sea into the connection 26 and the valve 29 serving to permit or prevent flow in the pipe 27.

In the operation of the apparatus shown in FIG. 3, when the tidal flow is in one direction as shown at the left hand side, the valves 24, 25, 28 and 29 associated with each chamber are arranged so that the water is pumped by the impeller 5 and flows through the connection 26 into the chamber 21 and out through the connection 22 and the pipe 23 into the pipe 20. However, when the tidal flow is reversed, as shown at the right hand side, all the valves are changed over so that the water now flows in each chamber through the pipe 23 and the connection 22 into the chamber 21 and out of the chamber 21 through the connection 26 and pipe 27 into the pipe 20. Thus, in whichever direction the tidal flow is, the direction of flow in the pipe 20 is always the same. The apparatus uses the sea water as the working fluid and discharges the water back into the sea through an outlet pipe 30 after it has been used to generate electricity.

The valves 24, 25, 28 and 29 are devised so that they take up their appropriate positions according to the direction of flow.

It will be appreciated that the apparatus shown in FIGS. 1 and 2 or in FIG. 3 will be operative over a much longer period daily than tidal barrage schemes and since the time of the tides varies, a large part of the total installed capacity will always be generating electricity.

While it is not contemplated that the output of one of the apparatus is likely to be comparable with that of a modern steam, hydroelectric or nuclear power station, it is contemplated that a large number of the apparatus could be located around the shores of the country and be linked to a National Grid. The apparatus can be of low capital cost and should need little maintenance or attention over a long period. Furthermore, since the apparatus or a major part of it is submerged, it should therefore be environmentally acceptable. Since no fuel is required to power the apparatus no pollution occurs. Furthermore, the appartus could be adapted to make use of ocean currents such as the Gulf Stream, Labrador Current or Humboldt Current and could thus generate electricity for 24 hours a day. The apparatus could also be adapted for making use of river currents, particularly at weirs, when it would be useful for satisfying local requirements as to electricity, especially in remote localities, or local requirements of an essential nature such as for hospitals or traffic lights.

In yet a further modification of the apparatus, the transverse chambers and low speed driving units can be associated with a series of boxes or towers in some of which water can be trapped as the tide rose, and interconnections between the boxes could be operated in such a way that, irrespective of the state of the tide, there was a flow of water from one box to another for causing flow of water in one or other of the pipes 1 and 2. This modification may, however, not be so environmentally attractive.

What is claimed is:

1. A method of intensifying a fluid flow, comprising the steps of causing a relatively slow speed natural substantially horizontal flow of a natural fluid to turn rotary means about a substantially horizontal axis, causing said rotary means to act directly on a working fluid and force the working fluid through a pipe system without the formation of an elevated head to a flow intensifier in the form of a constriction whereby the flow of working fluid is sufficient to drive means for generating electricity.

2. The method of claim 1, wherein the working fluid is different from the natural fluid.

3. The method of claim 1, wherein the working fluid is the same as the natural fluid.

4. The method of claim 1, wherein the natural fluid is selected from the group consisting of sea water, fresh flowing water and air.

5. The method of claim 3, wherein both fluids are sea water.

6. The method of claim 1 and further comprising the step of using the intensified flow of working the fluid to drive said means for generating electricity and thereby generating electricity.

7. Apparatus for intensifying a fluid flow, comprising a pipe system, a flow intensifier in the form of a constriction in said pipe system, driven means in said flow intensifier adapted to be driven by a flow of a working fluid in said flow intensifier and adapted to drive means for generating electricity, rotary means rotatable about a substantially horizontal axis associated with said pipe system for forcing working fluid without the formation of an elevated head to said flow intensifier and means drivable by a relatively slow speed natural substantially horizontal flow of a natural fluid to turn said rotary means.

8. The apparatus of claim 7, wherein the pipe system is a closed system filled with said working fluid.

9. The apparatus of claim 7, the pipe system comprising at least two pipes at least one of which leads to said flow intensifier, a plurality of chambers interconnecting said pipes, rotary means in each said chamber, and means for returning working fluid from the flow intensifier to either one of said pipes.

10. The apparatus of claim 9 and adapted to intensify an alternating flow of natural fluid, wherein each pipe leads through a common connection to the flow intensifier, there being return pipes leading from the flow intensifier back to each pipe, and wherein valve means are provided to control the flow of working fluid so that, when the rotary means is forcing working fluid from the first pipe to the second, the working fluid is constrained to flow from the second pipe through said flow intensifier and back through a first return pipe to the first pipe, and so that, when the rotary means is forcing working fluid from the second pipe to the first as a result of a change in direction of the flow of natural fluid, the working fluid is constrained to flow from the first pipe through said flow intensifier and back through a second return pipe to the second pipe.

11. The apparatus of claim 9, wherein the two pipes are connected at each end to a flow intensifier and return means.

12. The apparatus of claim 7, wherein the apparatus is adapted to use the natural fluid as the working liquid.

13. The apparatus of claim 12, wherein the apparatus comprises a closed pipe connected at one end to said flow intensifier, pump chambers containing said rotary means, pipes connecting each end of each pump chamber to the closed pipe and to the natural fluid, and valves controlling said pipes so that whichever way the natural fluid is flowing, the natural fluid will be forced in one or other direction through the pump chambers and appropriate ones of said pipes into the closed pipe while the natural fluid is allowed to flow into the pump chambers.

14. The apparatus of claim 7, wherein each rotary means comprises an archimedean screw-type impeller.

15. The apparatus of claim 14, wherein the impeller is sealed to the inside of a tube which is sealingly mounted in a cylindrical chamber.

16. The apparatus of claim 7, wherein said means drivable by the natural fluid comprises at least one propeller mounted on a shaft common with the rotary means.

17. The apparatus of claim 16, wherein the shaft extends through the chamber containing the rotary means and comprises at least one propeller at each end.

18. The apparatus of claim 16 wherein each propeller is surrounded by a flow-directing tube.

19. The apparatus of claim 18, wherein the inside of each flow-directing tube is fitted with a plurality of helically extending vanes.

20. The apparatus of claim 9, wherein the means drivable by the natural fluid comprises an air propeller mounted so as to be able to turn to face the wind.

21. The apparatus of claim 13 and adapted to be operated with sea water as the natural fluid, wherein a framework mounted on top of the apparatus carries hinged arms connected to buoyancy tanks having depending arms connected to piston rods of pistons and mounted in cylinders fitted with valve means, the arrangement being such that as a tank falls due to tidal ebb or wave action, water is drawn into the cylinder above the piston, and as the tank rises, the water is forced into the pipe system.

22. The apparatus of claim 7, wherein the means drivable by the flow of natural fluid is associated with a series of boxes or towers in at least some of which water can be trapped as a tide rises, there being interconnections between the boxes or towers operable such that, irrespective of the state of the tide, water would flow from one box or tower to another to operate said means.

23. A method of intensifying a fluid flow, wherein a plurality of the apparatus claimed in claim 7 and each adapted to operate with water as the natural fluid is so disposed within the natural fluid as to be capable of causing a vortex or maelstrom, the force of which serves to drive said means drivable by the natural flow of natural fluid.

* * * * *